Sept. 15, 1925. 1,553,934
W. S. DYE
APPARATUS FOR USE IN CONNECTION WITH THE MANUFACTURE OF
CONFECTIONERY AND THE LIKE
Original Filed March 7, 1925
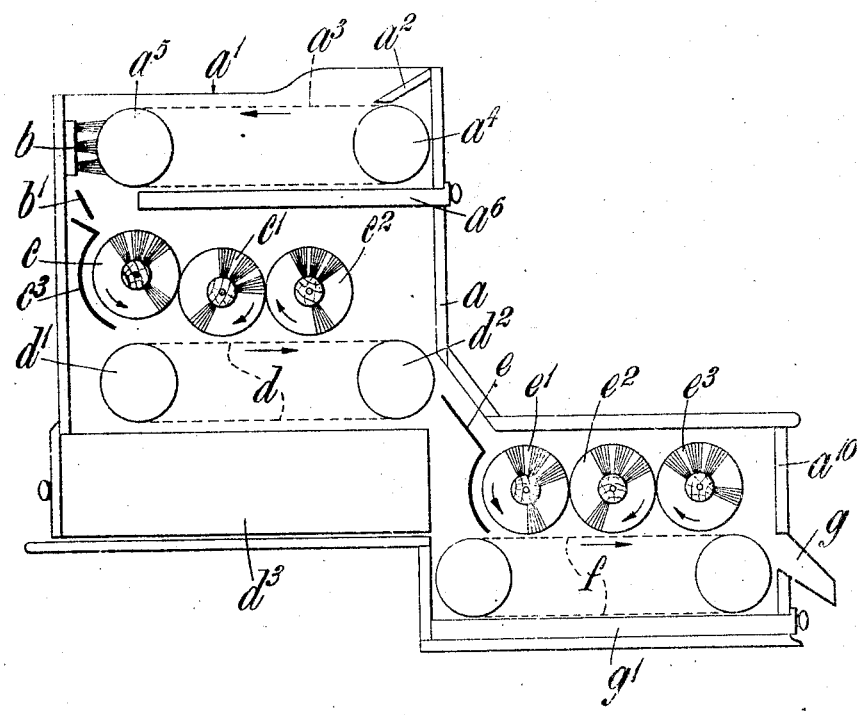
INVENTOR:
Walter Sawford Dye.
ATTORNEY:

Patented Sept. 15, 1925.

1,553,934

UNITED STATES PATENT OFFICE.

WALTER SAWFORD DYE, OF NORWICH, ENGLAND, ASSIGNOR TO BAKER-PERKINS COMPANY INCORPORATED, OF WHITE PLAINS, NEW YORK, A CORPORATION OF NEW YORK.

APPARATUS FOR USE IN CONNECTION WITH THE MANUFACTURE OF CONFECTIONERY AND THE LIKE.

Original application filed March 7, 1925, Serial No. 13,888. Divided and this application filed May 28, 1925. Serial No. 33,388.

*To all whom it may concern:*

Be it known that I, WALTER SAWFORD DYE, residing at Norwich, England, a subject of the King of Great Britain and Ireland, have invented certain new and useful Improvements in or Relating to Apparatus for Use in Connection with the Manufacture of Confectionery and the like, of which the following is a specification.

This invention relates to apparatus for use in connection with the manufacture of confectionery and the like, for removing or cleaning off the starch or moulding material after moulding the confections, prior to their being crystallized or otherwise, and of that type in which the confections are treated, whilst travelling on a conveyor of wire or other open work, to the action of rotary brushes which may, if desired, revolve in opposite directions and which remove the moulding material allowing it to fall through the conveyor for collection in any suitable manner.

According to this invention the confections are passed to a perforated screen and between the latter and the first of a series of rotary brushes, adapted to revolve in different directions, the screen being for instance curved to partly enclose said first brush, whereby it assists the confections to travel about same and leads them to the conveyor with which the brushes co-operate.

The said brushes are arranged in a plurality of rows or groups disposed at different levels and if required in different compartments, in which case each series coacts with a separate conveyor and the first brush of each series is provided with a perforated screen as described.

After treatment the confections are delivered in completely cleaned condition ready for further processes of manufacture if required.

Each compartment has a powder drawer beneath the wire conveyor for collecting the brushed off powder, thus saving it from blowing about.

All driving pulleys and bearings are disposed externally of the compartments so that no grease may contaminate the confectionery or the powder, while no hand labour of any kind is necessary once the confections have entered the apparatus until expelled for example on to trays. Appropriate driving mechanism and gearing for various speeds is incorporated according to requirements.

The different compartments of the apparatus are relatively superposed or at different levels and carried on a framework or trestle so as to be at the side of and slightly above the final cleaning compartment, but such arrangement is not essential.

An embodiment of the invention is illustrated in the accompanying drawings in which the figure is a diagrammatic view showing the general arrangement of parts and method of operation.

The apparatus shown in the drawing comprises a casing $a$ closed except at the top $a^1$. The confections to be cleaned are delivered or fed down an inclined board or plate $a^2$ to a conveyor or band $a^3$ carried by rollers $a^4$, $a^5$, and moving in the direction indicated by the arrow. On reaching the end of the conveyor the confections pass a stationary brush $b$ which removes a portion of the powder, and pass thence on to an inclined perforated screen $b^1$ down which they pass to a series of revolving brushes $c$, $c^1$, $c^2$ which rotate in the directions indicated by the arrows and the first of which is partly enclosed by a curved perforated screen $c^3$ which assists the confections to travel about said brush $c$. The confections pass along a second conveyor $d$, formed of wire, slats or other openwork in the direction of the arrow, being at the same time subjected to the brushing action of the brushes $c$, $c^1$, $c^2$ this conveyor being mounted on rollers $d^1$, $d^2$. On leaving said conveyor $d$ the confections pass down another perforated screen $e$ shaped to partly enclose the first of a second series of revolving brushes $e^1$, $e^2$, $e^3$ in a lower compartment $a^{10}$ of the casing and which rotate in the directions indicated by the arrows and subject the confections to a further and final brushing action while they move along on a conveyor $f$ similar to the one $d$ and the said confections are finally delivered from the conveyor out of the casing through a chute $g$.

Below each of the conveyors $a^3$, $d$ and $f$ is a drawer or tray $a^6$, $d^3$ and $g^1$ respectively for collecting the powder or starch removed by the adjacent brushes.

The particular driving mechanism by which the movement of the conveyors and brushes is effected may be of any known or suitable kind and forms no essential part of the invention, but as mentioned above it is arranged exteriorly of the casings or compartments for the purpose stated.

What I claim as my invention and desire to secure by Letters Patent of the United States is:—

1. In apparatus for the manufacture of confectionery, the combination of a plurality of openwork conveyors, disposed at different levels, series of rotary brushes, each series co-operating with a conveyor to remove moulding material from the confections, and a perforated screen associated with the first brush of each series and partly surrounding same, the confections being fed between the screen and first brush and being guided by same in conjunction with the brush to the openwork conveyor pertaining to the respective series of brushes.

2. In apparatus for the manufacture of confectionery, the combination of a plurality of openwork conveyors, disposed at different levels, series of rotary brushes, each series co-operating with a conveyor to remove moulding material from the confections, a perforated screen associated with the first brush of each series and partly surrounding same, the confections being fed between the screen and first brush and being guided by same in conjunction with the brush to the openwork conveyor pertaining to the respective series of brushes, conveying means for feeding the confections to the perforated screen associated with the first series of brushes, and a stationary brush between the last mentioned means and screen for giving the confections a preliminary brushing.

In witness whereof I have signed this specification.

WALTER SAWFORD DYE.